(12) United States Patent
Knowles

(10) Patent No.: US 7,773,367 B1
(45) Date of Patent: *Aug. 10, 2010

(54) CAPACITOR

(75) Inventor: Todd Knowles, Glendale, AZ (US)

(73) Assignee: Tantalum Pellet Company, Phoenix, AZ (US)

( * ) Notice: Subject to any disclaimer, the term of this patent is extended or adjusted under 35 U.S.C. 154(b) by 320 days.

This patent is subject to a terminal disclaimer.

(21) Appl. No.: 11/849,198

(22) Filed: Aug. 31, 2007

Related U.S. Application Data

(63) Continuation-in-part of application No. 11/380,504, filed on Apr. 27, 2006, now Pat. No. 7,301,754.

(51) Int. Cl.
 *H01G 9/042* (2006.01)
(52) U.S. Cl. .................. 361/529; 361/523; 361/525; 361/528; 361/540; 361/541
(58) Field of Classification Search .......... 361/508, 361/509, 502–504, 516–519, 528–529, 523–525, 361/530, 540–541
See application file for complete search history.

(56) References Cited

U.S. PATENT DOCUMENTS

| | | | |
|---|---|---|---|
| 3,349,295 A | 10/1967 | Sparks | |
| 3,548,265 A | 12/1970 | Buice et al. | |
| 4,024,625 A | 5/1977 | England | |
| 4,298,906 A | 11/1981 | Elias | |
| 5,001,607 A | 3/1991 | Breithaupt | |
| 5,105,341 A | 4/1992 | Stephenson et al. | |
| 5,777,840 A | 7/1998 | Oney | |
| 5,822,177 A * | 10/1998 | Popp et al. | 361/508 |
| 6,493,212 B1 * | 12/2002 | Clarke et al. | 361/521 |
| 6,587,329 B1 * | 7/2003 | Feger | 361/504 |
| 6,819,544 B1 * | 11/2004 | Nielsen et al. | 361/508 |
| 6,952,339 B1 | 10/2005 | Knowles | |
| 7,301,754 B1 * | 11/2007 | Knowles | 361/508 |
| 7,342,774 B2 | 3/2008 | Hossick-Schott et al. | |
| 2005/0177193 A1 | 8/2005 | Nielsen et al. | |
| 2006/0139850 A1 | 6/2006 | Rorvick et al. | |
| 2008/0232030 A1 | 9/2008 | Jones et al. | |

\* cited by examiner

*Primary Examiner*—Nguyen T Ha
(74) *Attorney, Agent, or Firm*—Booth Udall, PLC

(57) ABSTRACT

A capacitor and a method for assembling a capacitor. A capacitor is assembled from a case, which contains an anode that is electrically coupled to the case and defines wells or slots receiving a plurality of cathode plates. A header is placed on the case. The header also supports a glass seal that insulates the lead tube and cathode lead coming from the cathode. Once assembled, the capacitor is filled with electrolyte. A weld extends around the header to secure the header to the case. A bent cathode configuration enables a plurality of cathode plates electrically coupled together from a common cathode plate.

25 Claims, 10 Drawing Sheets

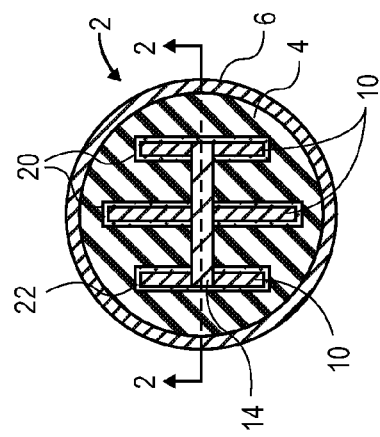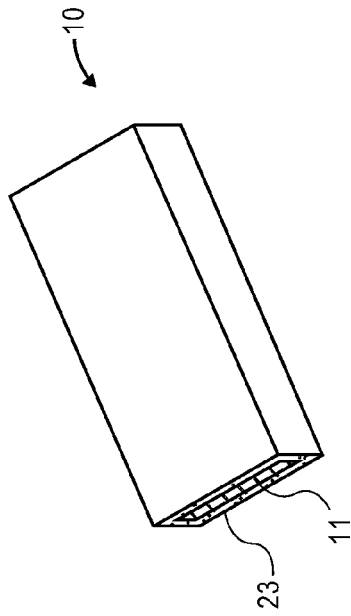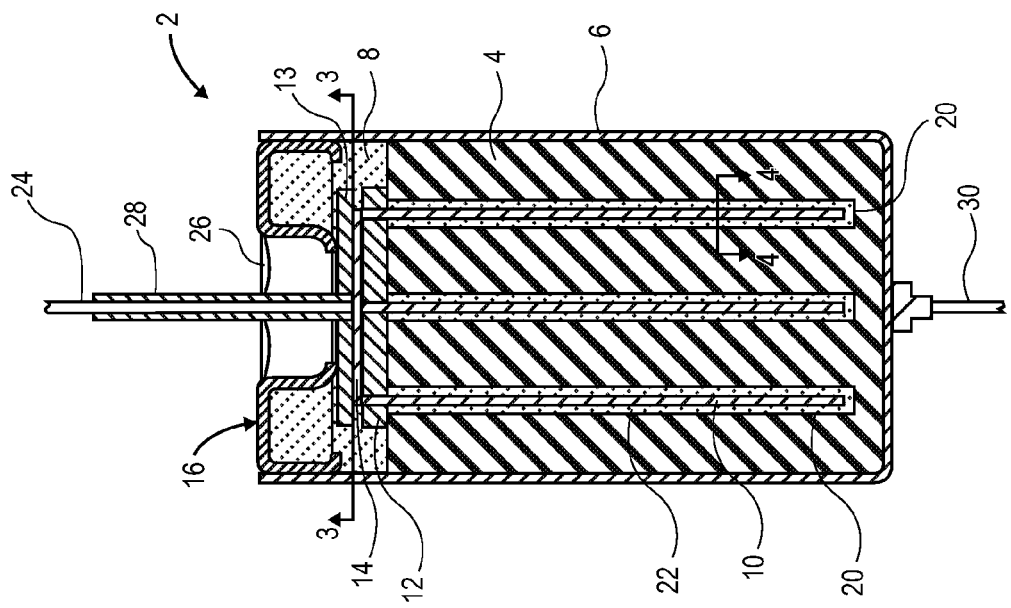

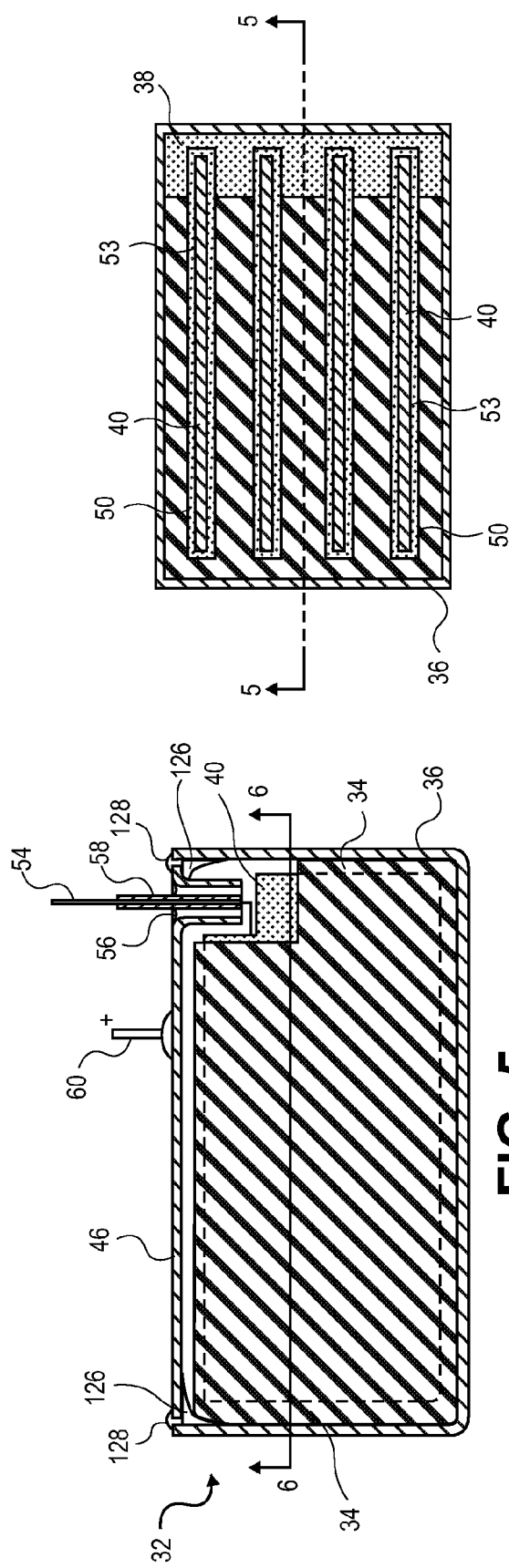
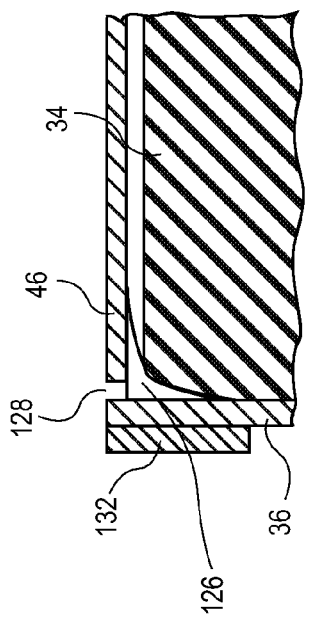

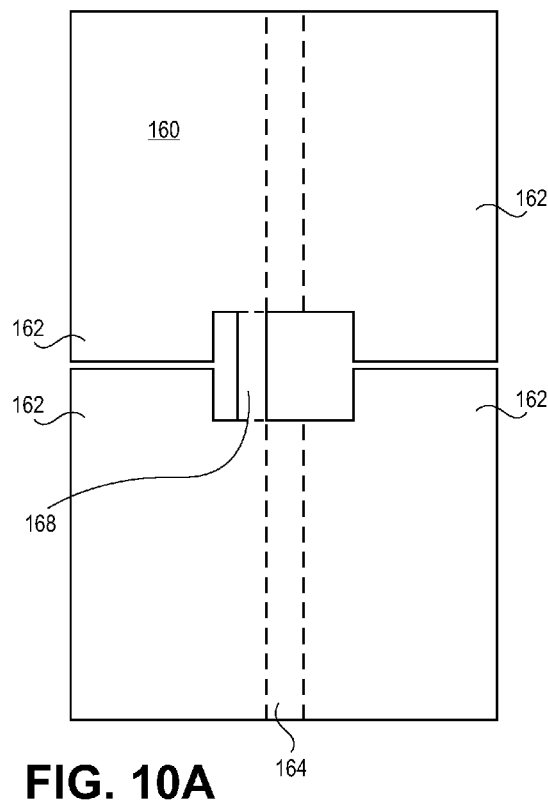
FIG. 10A
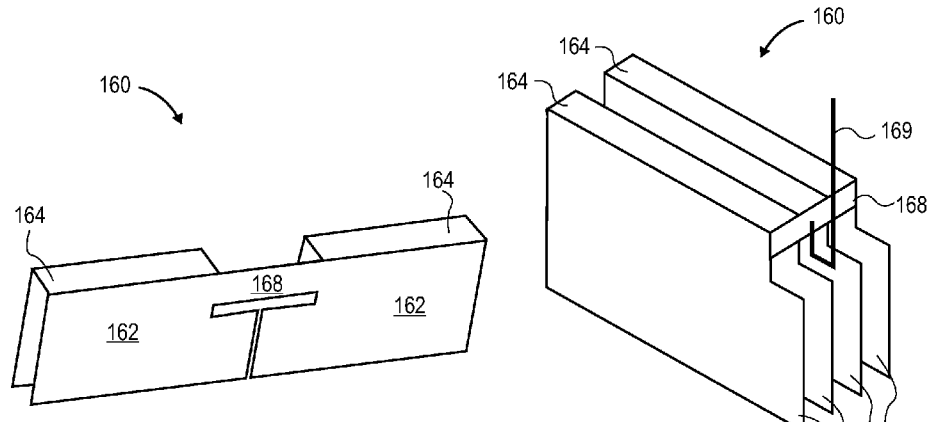
FIG. 10B  FIG. 10C

CAPACITOR

CROSS REFERENCE TO RELATED APPLICATIONS

This document is a continuation-in-part application of the earlier U.S. Utility Patent Application to Todd Knowles entitled "Capacitor," application Ser. No. 11/380,504, filed Apr. 27, 2006, now pending, the contents of which are hereby incorporated herein by reference.

BACKGROUND

1. Technical Field

Aspects of this document relate generally to a porous, valve metal anode capacitor design and manufacture. More specific implementations involve an anode support structure having a plurality of wells or slots containing cathode plates, and to a method for assembling the capacitor.

2. Background Art

There are three known general classifications for arranging the components an electrolytic capacitor. The first type is shown and described in many patents and publications, among them is U.S. Pat. No. 6,952,339 to Knowles (issued Oct. 4, 2005) ("Knowles"). Knowles discloses an arrangement wherein a hollow, cylindrical cathode ring is placed in a capacitor case and a cylindrical anode core in the form of a porous tantalum pellet is placed within the cylindrical cathode ring. The spaces between the cathode and anode components, as well as the pores within the anode itself, are filled with electrolyte. The disclosure of Knowles is hereby incorporated herein by reference.

The second type is disclosed in U.S. Pat. No. 5,926,362 to Muffoletto (issued Jul. 20, 1999) ("Muffoletto"), among other patents and publications, and describes an arrangement wherein an anode block is placed within a rectangular case. The cathode includes high surface area materials which are applied to either the inside surfaces of the case adjoining the faces of the anodes or to separate plates installed adjacent to these same inside surfaces. In a particular design of Muffoletto, two capacitor cells, each having its own anode pellet and cathode plates, are separated by an intermediate wall within the same casing. Muffoletto provides a good description of how capacitors are generally created, the materials and processes conventionally used to create the capacitors, and the general functionality of capacitors. The disclosure of Muffoletto is hereby incorporated herein by reference for this general understanding of capacitor creation.

In both of the first and second types, the cathodes are electrically connected to the case and the anodes are isolated from the cathodes and from the case in some manner. The electrical connection to the anode(s) is made through an insulated penetration in the case.

The third type is shown and described in U.S. Pat. No. 3,349,295 to Sparkes (issued Oct. 24, 1967) ("Sparkes"), which discloses an arrangement wherein a hollow, cylindrical anode ring is placed in a capacitor case and a cylindrical cathode core is placed within the anode ring. The general structure of FIG. 2 of Sparkes is shown as FIG. 1 (prior art) of the present disclosure for reference, but without reference numbers.

SUMMARY

In one aspect, this document features an electrolytic capacitor wherein the anode is electrically and mechanically connected to the case and the cathode is electrically isolated from the case and is fitted into slots or wells within the anode. Implementations of an electrolytic capacitor may include one or more of the following components such as a capacitor case, an anode material defining one or more slots within the case, cathodes comprising a conductive core or substrate and a high surface area capacitive material layer, and a separator between the anode and cathode. A particular implementation of a cathode comprises a cathode plate cut and/or bent to form a plurality of substantially parallel cathode plates electrically coupled together. Another particular implementation of a cathode comprises a cathode plate bent to form a cylinder of adjacent parallel cathode plates electrically coupled together. Aspects of the disclosure may readily be adapted to a variety of other capacitors, capacitor materials and methods of creating capacitors.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 2 is a cross-sectional diagram of a first implementation of a capacitor taken along sectional line 2-2 of FIG. 3;

FIG. 3 is a second cross-sectional diagram of the first implementation of a capacitor taken along sectional line 3-3 of FIG. 2;

FIG. 4 is a cross-sectional perspective view of a cathode taken along sectional line 4-4 of FIG. 2;

FIG. 5 is a cross-sectional diagram of a second implementation of a capacitor taken along sectional line 5-5 of FIG. 6;

FIG. 6 is a second cross-sectional diagram of the second implementation of a capacitor taken along sectional line 6-6 of FIG. 5;

FIG. 8 is a close-up view of the junction portion of FIG. 5;

FIGS. 10A, 10B and 10C are views of bending stages for a particular implementation of a cathode plate;

DESCRIPTION

Figure 1:
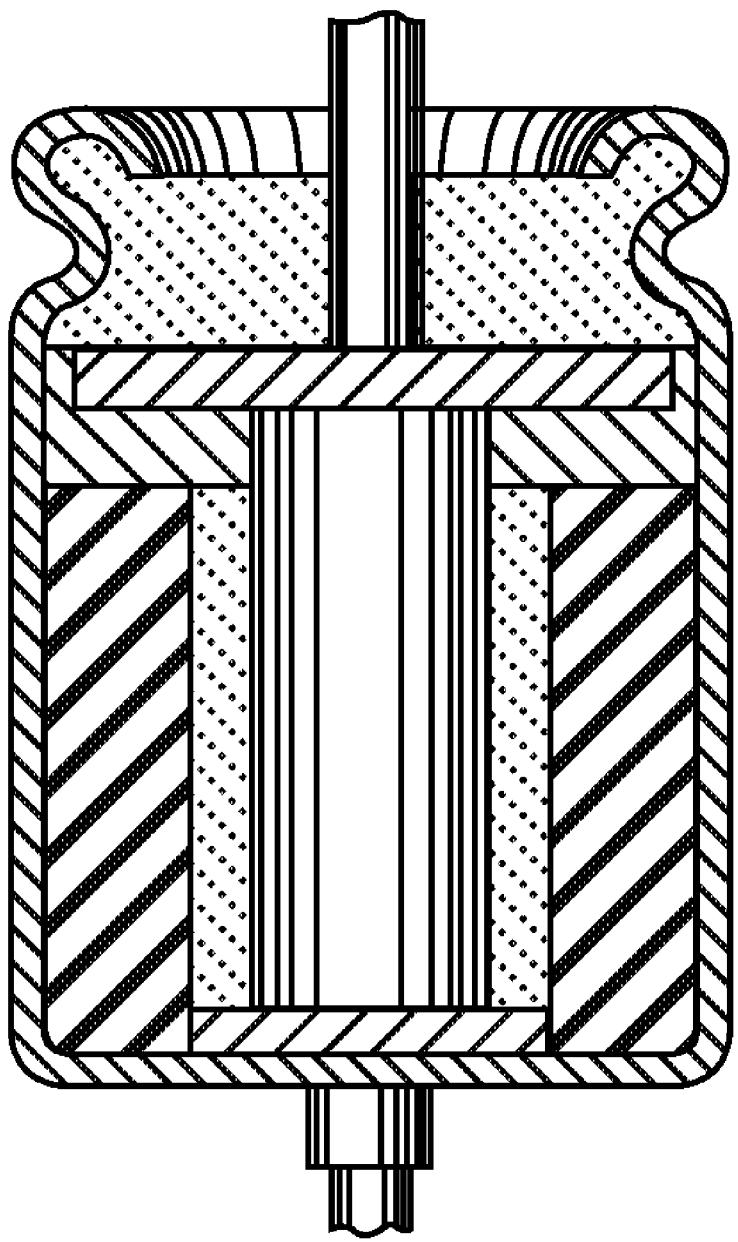
FIG. 1 is a prior art diagram from U.S. Pat. No. 3,349,295 with the reference numbers removed.

This disclosure, its aspects and implementations are not limited to the specific components or assembly procedures disclosed herein. Many additional components and assembly procedures known in the art consistent with the intended capacitor and/or assembly procedures for a capacitor will become apparent for use with implementations of electrolytic capacitors from this disclosure. Accordingly, for example, although particular hardware is disclosed, such hardware and implementing components may comprise any shape, size, style, type, model, version, measurement, concentration, material, quantity, and/or the like as is known in the art for such hardware and implementing components, consistent with the intended operation of assembling a capacitor.

Generally, capacitors comprise an anode electrode and a cathode electrode housed inside of a hermetically sealed casing. Capacitor electrodes are activated and operatively associated with each other by an electrolyte contained inside the casing.

The casing of a capacitor generally includes a capacitor case of rectangular or cylindrical shape and a header or lid secured to the side walls of the case. As used herein, "header" may include just a lid or cap to cover the top opening of a capacitor or may also include the glass to metal seal and lead tube that allows a conductor or lead to extend isolated from within the case. The header is generally welded to the case, such as by laser welding.

The casing is generally made of a conductive material and serves as one terminal or contact for making electrical connection between the capacitor and its load. The other electrical terminal or contact for the capacitor is provided by the conductor or lead that extends from within the capacitor through the casing, such as through the header or side wall. The lead is insulated electrically from the metal header by an insulator and seal structure. An electrolyte fill opening in the header is closed after the electrolyte is filled into the casing. The general structure and relationships of these various components will be discussed in more detail below.

Cathodes for capacitors relevant to this disclosure fall primarily into three categories, each of which are appropriate for use with implementations disclosed herein. Those categories are, namely, 1) pressed and sintered; 2) homogeneous material; and 3) coated. Pressed and sintered cathodes and homogeneous material cathodes may overlap due to the nature of the material used. For example, making a cathode of tantalum or niobium metal powder may be done through pressing and sintering the powder to the desired shape.

The last category, coated cathodes, use any base foil material that is chemically compatible with the electrolyte to be used, if any, as a conductive substrate, such as stainless steel, silver, niobium, tantalum and others, and coats the foil cathode plate through painting or spraying methods or other methods known in the art to create a capacitive material layer around the conductive substrate. Examples of capacitive materials that may be used include, but are not limited to, a finely divided carbonaceous material such as graphite or carbon or platinum black, palladium or ruthenium oxide, or an electroactive conducting polymer such as polyaniline, polypyrole, polythiophene and polyacetylene, and mixtures thereof. An example of the use and manufacture of a cathode from a conductive substrate coated with ruthenium oxide as a capacitive material layer is shown and described in U.S. Pat. No. 6,707,660 to David Evans et al. titled "Prismatic Capacitor", the disclosure of which is hereby incorporated herein by reference.

When the casing serves as one terminal or contact for the capacitor, the casing serves as the conductive substrate or the conductive substrate provided with the capacitive material is electrically connected to the casing. In either case, a conductive casing material is selected based on its compatibility with the electrolyte and is often selected from the group consisting of tantalum, titanium, niobium, stainless steel, silver, copper, and aluminum, and mixtures and alloys thereof. The header is also preferably of one of the above conductive materials.

The anode electrode of a capacitor relevant to this disclosure is typically made of a valve metal. Valve metals include at least, tantalum, aluminum, titanium, niobium, zirconium, hafnium, and mixtures thereof. With present technology and economics, this is most often accomplished using tantalum and sometimes niobium. In conventional capacitor designs, though implementations disclosed herein include other designs as well, the anode metal in powdered form, for example tantalum powder, is compressed into a pellet having an anode lead extending therefrom, and sintered under a vacuum at high temperatures. The porous body is then anodized in a suitable electrolyte to form a continuous dielectric oxide film on the sintered body.

A separator of electrically insulative material is provided between the anode and the cathode to prevent an internal electrical short circuit between the electrodes. The separator material also is chemically unreactive with the anode and cathode capacitive materials and both chemically unreactive with and insoluble in the electrolyte for electrolytic capacitors. In addition, the separator material has a degree of porosity sufficient to allow flow therethrough of the electrolyte during the operation of the capacitor. Illustrative separator materials include woven and non-woven fabrics of polyolefinic fibers including polypropylene and polyethylene or fluoropolymeric fibers including polyvinylidene fluoride, polytetrafluoroethelene (Teflon®), polyethylenetetrafluoroethylene, and polyethylenechlorotrifluoroethylene laminated or superposed with a polyolefinic or fluoropolymeric microporous film, non-woven glass, glass fiber materials and ceramic materials.

Figure 9:
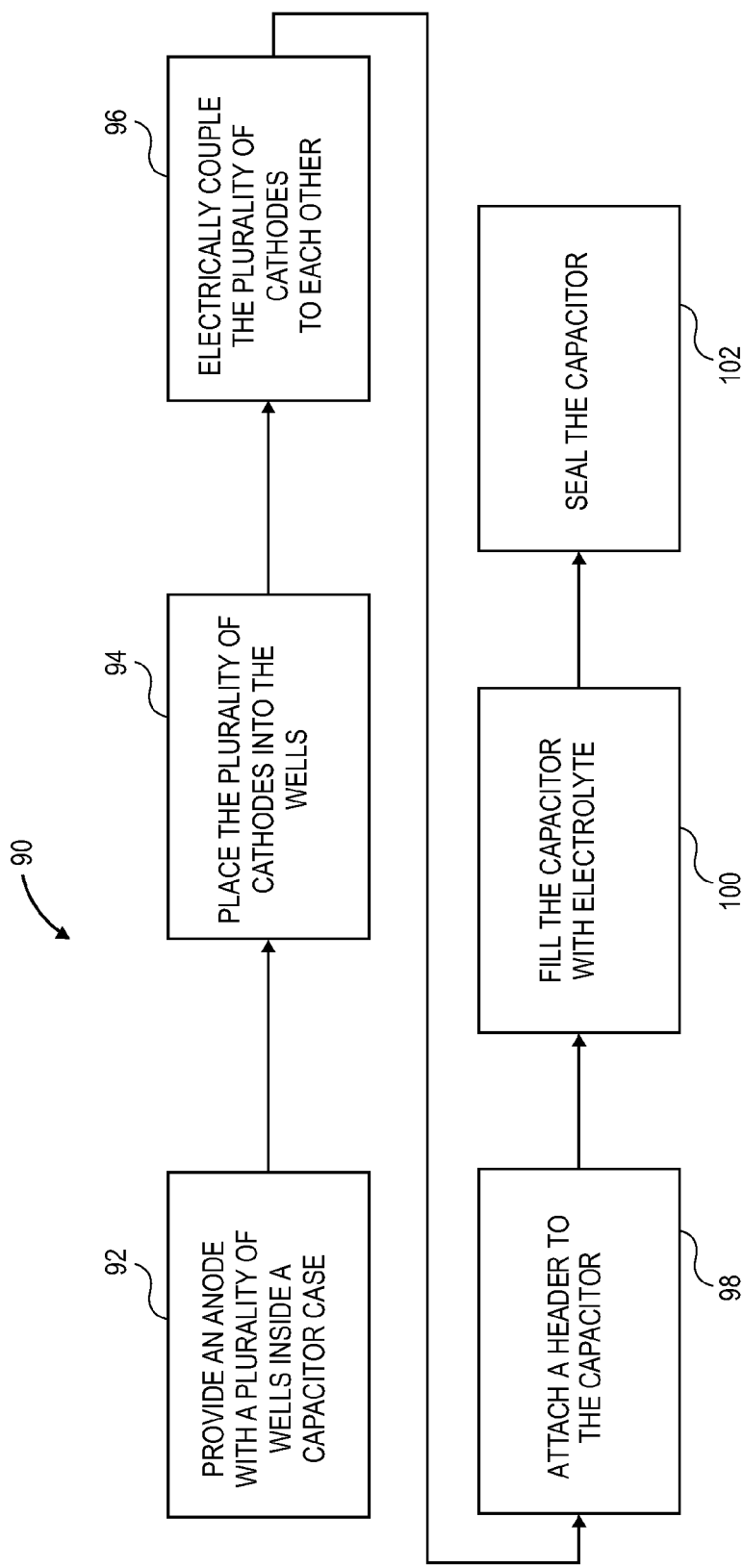
FIG. 9 is a flow diagram illustrating a method of constructing a capacitor.
Figure 11:
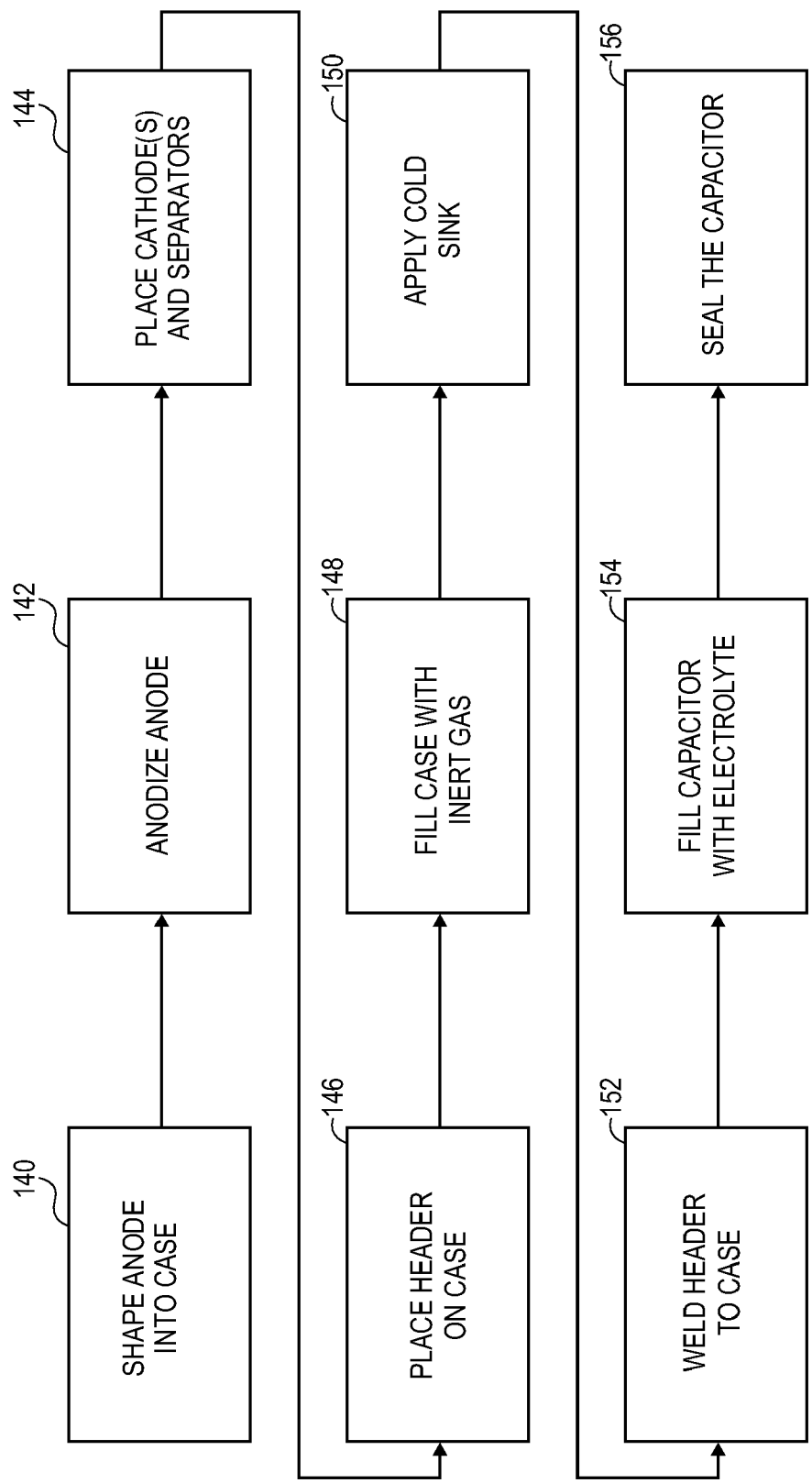
FIG. 11 is a flow diagram illustrating a method of constructing an electrolytic capacitor with a welded header.

In a particular first implementation of a capacitor 2 as illustrated in FIGS. 2 and 3, a porous tantalum anode 4 is contained in a capacitor case 6. FIG. 9 illustrates an example of a method 90 that may be used to make electrolytic capacitors and will be described in conjunction with this first implementation. It should be understood, however, that this implementation is only one example and that the method may be used with many implementations of electrolytic capacitors. A first step in method 90 is to provide an anode with a plurality of wells inside a capacitor case (Step 92, FIG. 9). The wells of the various implementations may be shaped as slots having lengths and depths much greater than (i.e. more than four times or more than ten times) their widths, or may be shaped to receive cathodes of other shapes and sizes, such as cylindrical, circular discs, square or triangle discs, cubes, squares or rectangular discs, and other shapes. Additionally, the wells may be completely surrounded by anode material or may only include anode material only on particular opposing sides such that the well is in the shape of a slot in the anode material with an open end or ends for particular implementations (much like the top portion of the anode 34 in FIGS. 5 and 6 where the anode slot is open on one end).

For the implementations shown in FIGS. 2 and 3, similar to conventional tantalum capacitor cases, the case of this first implementation is cylindrical with one closed end and one open end. The case 6, however, may also be any cross-sectional shape desired, provided the shape does not interfere with the operation of the capacitor 2. The case 6 may be made from a metal, such as tantalum, titanium, aluminum, niobium or any other metal conventionally used for capacitors, preferably made of the same metal as the metal powder used for the anode. The case 6 material may be selected from a material that does not react with the electrolyte 8, is capable of forming a dielectric, and can protect the components within the case 6. The cathode 10 of this particular implementation is shaped as a plate rather than as a hollow cylinder or a cylindrical pellet core. This plate may be a flat plate, or may be shaped or bent as needed for particular implementations.

The porous anode material may alternatively be made of tantalum, titanium, aluminum, niobium or any other material that forms a dielectric layer using the same material as or a compatible material with the case 6. The anode material of particular implementations shown in this application is shaped into an anode in conventional ways using conventional materials. Unconventionally, however, the materials used as the anode are made into different shapes. For example, as shown in FIGS. 2-3, 5-6 and 8, the anode 4 may be shaped to include one or more slots or wells 20. The anode 4 may be shaped within the case through compression of powdered or other anode materials within the case, or shaped separately in one or more pieces and deposited within the case. In a particular implementation, the anode 4 is shaped separate from the case in a plurality of pieces and then coupled together for use inside the case. In another particular implementation, the case and anode may be formed of a plurality of pieces each, for example 2. The anode and/or case may be formed in halves and then welded together. Compressing the anode in halves or more pieces and then assembling the anode may provide more even compaction of the anode material. The case 6, because it is immediately adjacent the anode 4 in particular implementations, also acts as an anode for the capacitor 2 and serves as its electrical connection. Note that when the anode is formed having wells, the wells are contiguously surrounded by the anode material on at least two opposing sides (e.g. the front and back).

Although there are many advantages realized through the use of particular implementations disclosed, some mentioned herein and others not mentioned, one particular implementation stems from the anode 4 within the case not being a hollow ring. Because the anode 4 has a larger wall thickness than conventional capacitors (through the use of slots 20), the case 6 wall thickness may be made smaller than with conventional case walls. This may result in a lighter capacitor.

A cathode's effectiveness relates generally to its surface area. The use of a capacitive material 23 on the conductive substrate 11 of the cathode 10, such as ruthenium oxide, results in an increase of cathode capacitance that enables the capacitor to store a greater charge. While there are many suitable cathode materials known in the art, a few high surface area capacitive materials that are considered particularly useful include, tantalum, niobium, palladium, carbon, graphite, platinum and ruthenium oxide. Other materials such as aluminum are also theoretically possible.

A thin layer 23 of ruthenium oxide or other suitable high surface area coating known in the art may be placed over the cathode plate 10. FIG. 4 illustrates a cross-section of a foil cathode plate 10 showing the foil cathode plate 10 in the center of a capacitive material layer 23. For purposes of the other Figures, the conductive substrate 11 and capacitive material layer 23, if used, are referenced together as the cathode electrode 10. Because any contact between the foil cathode plate 10 and the anode 4 would short the capacitor and cause it not to function properly, separation between the cathode plate 10 and the anode 4 is achieved with an appropriately configured separator 22 (FIGS. 2 and 3). Appropriate separators were discussed earlier in this disclosure, but include insulators that are chemically compatible with the electrolyte. Separators should be thin but durable enough to withstand the assembly process.

Capacitors may use liquid or solid electrolytes. For use with a solid electrolyte such as manganese dioxide or a polymeric conductor, the cathode plates would perform the role of a contactor and the assembly step order in FIG. 9 would be amended so that the solid electrolyte is applied prior to attaching the capacitor header 16. For use with a liquid electrolyte, the capacitor case 6 is generally filled with electrolyte 8 through the lead tube 28 after attaching the capacitor header 16. The electrolyte 8 permeates the pores of the anode 4, the cathode plate 10 if it has any, and the separator 22.

In cases where a separator 22 is not used or in addition to the separator 22, an isolator could be placed within the slot 20 to maintain the separation of the cathode 10 and anode 4, and a liquid electrolyte may be used. Isolators are conventionally used in tantalum capacitors between a tantalum anode core and a tantalum cathode shell. An example of isolator use that may readily be applied to the present implementations is shown and described in U.S. Pat. No. 6,952,339 to Knowles titled "Tantalum Capacitor Case With Increased Volumetric Efficiency," the disclosure of which is incorporated herein by reference.

Because the cathode plates and the separator material are of a planar nature, they can be easily made as a flat assembly which can be folded later as required to fit within the wells. The assembly in particular implementations would look like a sandwich of separator material, cathode plate, and separator material. Each layer being cut to fit (after being folded) into the wells provided in the anode structure. The top and bottom separator layers would likely be slightly larger in every dimension than the cathode plate and would be joined by heat, pressure, friction or other conventional method, around the perimeter of the cathode plate to completely envelope the cathode plate just beyond its extents. Once protected, the cathode plate can be folded, twisted and inserted into the anode wells without further concern of contact with the anode. The plurality of cathode plates 10 are placed in the plurality of wells in the shape of slots 20 in the anode (Step 94, FIG. 9).

One or more isolators 12 and 13, as shown in FIG. 2, may be placed in the case 6 to isolate the cathode 10 and cathode tie plate 14, if used, from the anode 4 and capacitor header 16. The cathode tie plate 14 is shown as a flat plate coupling the cathodes 10 to each other and to the cathode lead 24. The particular size and shape of the tie plate 14 is not important to the invention and other cathode tie plates 14 or other electrically conductive structures of other sizes, shapes and dimensions may be substituted for the cathode tie plate 14 shown to serve the function of electrically coupling the cathode plates 10 together (Step 96, FIG. 9). The isolators 12 and 13 may be made in any shape that serves to separate and support the cathode components 10 and 14 from the anode components 4, 6 and 16. For example, the isolator 12 or 13 may form a grid that surrounds the cathodes 10 or cathode lead 24. If an isolator is used within the slots 20, it may be shaped as a cup to cradle the bottom of the plates 10. The isolator 12 or 13 may be made from any material that is electrically insulative and resistant to the electrolyte 8 that is placed around it. Teflon® is commonly used as isolator material for tantalum capacitors because it not only does not react with the electrolyte 8, it is also somewhat resilient, which tends to dampen forces applied to the capacitor 2 and will reduce the likelihood of damage to the cathodes 10.

A second isolator 13 may be placed on top of the anode 4. This isolator 13 may have the same shape as the first isolator 12 or it may be a different shape. This second isolator 13, like the first isolator 12, should be made from a material that is electrically insulative and resistant to electrolyte 8. Teflon® works well. Minimizing the space taken up by the isolators is important to capacitor design. The isolators should be designed with minimal volume to serve their purpose to increase the volume available for the electrolyte 8, anode 4 and cathode 10. By allowing more room for electrolyte 8, particular implementations may create a capacitor 18 with a longer life.

The header 16 may be placed on the capacitor case 6 (Step 98, FIG. 9). Although aspects of the disclosure are advantageous for many different capacitor designs and styles, for exemplary purposes only, a header design found in U.S. Pat. No. 6,952,339 to Knowles, the disclosure of which was previously incorporated herein by reference, is used. Reference may be made to the disclosure from that patent for additional understanding of the header 16. Other header styles and designs known in the art are contemplated and may be readily substituted or adapted for this particular header style. In short, however, the header 16 provided for this example may be shaped like a toroid with an outer and an inner annulus wall. The annulus walls may be connected at the top and have one or more openings at the bottom. This configuration will create a cavity in the header 16. In other words, it may be an annular header 16 with a 'U' shaped cross-section where the 'U' is facing downward. The center of the toroid may contain an insulative seal 26 of glass or other insulative material. This seal 26 provides electrical insulation and mechanical support for a lead tube 28. The lead tube 28 helps create a way for a cathode lead 24 attached to the cathode 10 through the cathode tie plate 14 to have access to the outside. The cathode lead 24, cathode tie plate 14 and cathodes 10 may be coupled through welding as is conventional in the art of capacitor manufacture.

The header 16 diameter may be larger or smaller than the case 6 as long as the header 16 fits inside the case 6 for this implementation. The header 16 is fit into the case 6. A small weld extends along the top edge of the case 6 creating a hermetic seal. The header 16 fitting within the case 6 allows for a weld to be created from the top of the case 6 rather than around the side. Welding from the top of the capacitor 2 rather than the side simplifies the welding process and enables manufacturers to even, for example, weld an entire tray of capacitors at a time. Like the case 6, the header 16 may be made from many different materials. The materials should be resistant to the electrolyte 8 and have enough strength to provide protection to the capacitor 2. Non-limiting examples of materials for use on a capacitor header 16 include tantalum, niobium, and titanium. The header 16 is electrically connected to the anode and case and it therefore preferably made of a material, like the anode, on which a dielectric layer can be formed. Like the anode 4 and the case 6, the header 16 is oxidized in these implementations. If the head weld used to attach the header 16 damages the oxide, it will need to be re-formed or re-oxidized. This may occur after the capacitor is filled with electrolyte when the voltage is first applied.

The next step in assembling a capacitor 2 is to fill the case 6 with an electrolyte 8 (Step 100 FIG. 9). This may be done by placing the capacitor 2 assembly in a vat of electrolyte 8 which is all placed in a vacuum chamber. The vacuum draws the air out of the case 6. When the vacuum is removed, the electrolyte 8 flows through the lead tube 28 into the case 6 to fill the void space in the case 6 and the cavity in the header 16. After the electrolyte 8 is in the capacitor 2, the capacitor may be sealed (step 102, FIG. 9). A small weld may be placed on the end of the lead tube 28, which seals as well as electrically connects the cathode lead 24 and the tube 28. The weld seals the capacitor 2 against the electrolyte 8 spilling out. The electrolyte 8 may be any of a number of well-known electrolytes known in the art for use with tantalum capacitors. One particular and non-limiting example is an aqueous solution of 38% by weight of sulfuric acid. An anode lead 30 may be welded or otherwise electrically coupled to the case 6.

FIGS. 5 and 6 illustrate a second implementation of a capacitor 32. This particular implementation includes tantalum as the primary anode and cathode material shaped to a box-shaped case rather than cylindrical-shaped case. The cathode plates disclosed according to this aspect of this disclosure may be of any shape including, but not limited to, square, rectangular, triangular or other polygonal shape, circular, oval, egg-shaped, or any other rounded or partially rounded shape.

For the implementation shown in FIGS. 5 and 6, a rectangular cathode plate 40 is used inside a box-shaped case 36. Similar to the implementation of FIGS. 2 and 3, the metal powder material that constitutes the anode 34 may be pressed into the case 36 or pressed outside of the case 36 and then inserted into the case 36. The slots 50 may be shaped in the anode 34 during pressing of the powder anode material using a mold (or other tooling that includes a die and punches which fit within the die to compress the powder and then eject the part), or by subsequent removal of the anode material. However, because the pressing process of shaping an anode from a suitable metal powder is conducive to using tooling, it is expected that in most cases the cathode plate slots 50 will be made when the anode 34 is shaped using suitable tooling.

Figure 7:
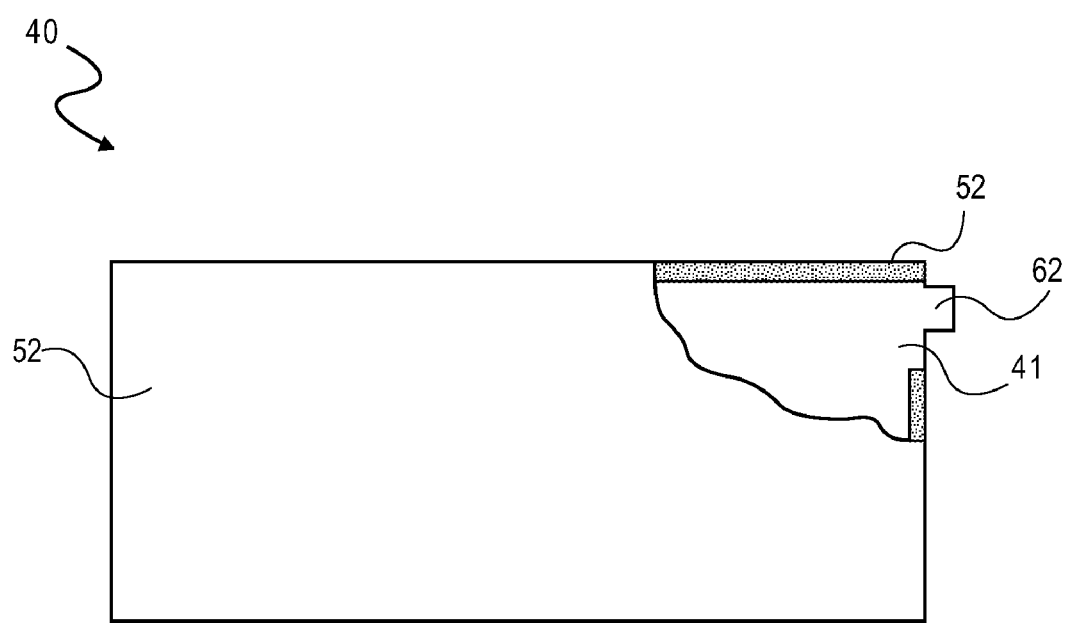
FIG. 7 is a view of a cathode plate with a section of a coating removed.

FIG. 7 illustrates one example of a cathode plate 40 with a thin capacitive material layer 52 surrounding a majority of the outer surface of a conductive substrate 41. In FIG. 7, the thin capacitive material layer 52 is removed along a portion of the visible side of the cathode plate 40 to show the capacitive material layer 52 and the conductive substrate 41. The material layer 52 shown is not in proportion to its actual thickness. Some portion of the cathode plate needs to have external access so that the cathode plates may be coupled to the cathode lead. In the particular implementation of FIG. 7, an optional node 62 is included to assist in electrically coupling the cathode plate 40 to the cathode lead.

According to yet another aspect of an electrolytic capacitor, a header welding process allows for attachment of a header on a capacitor case despite the heat generation problems typically experienced in electrolytic capacitors. The anode material typically used for electrolytic capacitors generally should be kept at a temperature less than 500° C. Typical processes to weld a header to a case heat the anode material to a temperature greater than 500° C., thereby heating the anode to undesirable temperatures resulting in heat generated impurities. FIGS. 5 and 8 illustrate an alternative design for electrolytic capacitors that allow the header 46 of an electrolytic capacitor 32 with an anode 34 electrically coupled to the case 36 to be heat welded to the case 36 without damaging the anode material or creating the undesirable heat generated impurities through the use of a protector ring 126.

The cathode plates 40 are covered with a separator 53 that is placed between each cathode plate 40 and the adjacent anode 36 material that defines the wells. The separator 53 may be coupled to the cathode plate 40, such as by sealing the cathode plate 40 in a separator envelope, or by simply pressing a separator into the cathode plate slots 50 with the cathode plate 40. The lead tube 58 and glass to metal seal 56 extend through the header 46. The cathode lead 54 extends through the header 46 and the anode lead 60 extends from the header 46. Alternatively, the anode lead 60 could be electrically coupled to some other portion of the case, but for convenience is included on the header 46. Using this configuration, the header 46 may be welded at the junction 128 between the header 46 and the case 36. A protector ring 126, for example made of Teflon®, may be included around the edge of the header 46 inside the case 36, as explained in more detail below.

FIG. 8 is a close-up view of the case 36, header 46 and anode 34 during a process to weld the header 46 to the case 36. One example of how the anode may be shaped and the header 46 may be welded to the case 36 is explained with reference to FIGS. 5, 8 and 9. The anode 34 may be molded or tooled into the case (Step 140 in FIG. 9) by adding anode appropriate powdered metal, such as tantalum, titanium, niobium or any other material suited to form a dielectric layer, and press molded into the appropriate shape with wells (20 in FIGS. 2 and 50 in FIG. 6). Though not in all cases, in many cases the shaped anode will also be sintered in the case. For the welding implementation shown in FIG. 5, where the welding is done near where the anode 34 would generally exist, the anode structure may be shaped to create a separation between the weld junction 128 and the anode 34 sufficient for the protector ring 126 to fit.

After the anode 34 is shaped (Step 140), the anode is anodized to form a dielectric film (Step 142). This may be done using conventional methods of anodizing, such as those disclosed in U.S. Pat. Nos. 3,277,553 to Wesolowki and 3,137,058 to Giacomello, the relevant disclosures of which are hereby incorporated herein by reference. Other equivalent methods of anodizing, now that it will be known to anodize the anodes within the case, are likely to be devised. The cathode(s) may be placed (Step 144) into the anode well(s) separated from the anode by an appropriate separator layer or spacer. Placing the cathode(s) depends upon which capacitor design is being used. For example, if a cylindrical cathode pellet is being placed within an anode ring, only a single cathode will be placed. If, however, a plurality of cathode plates are being placed in a plurality of wells within the anode (as shown with previous implementations disclosed herein and the relevant process of FIG. 9 describes), then multiple cathodes may be placed. In either situation, the cathode must be electrically separated from the anode, such as by the separator layer or a spacer, to create a working capacitor. If a plurality of cathode plates are used, they should, at some point, be electrically coupled together, such as through a cathode tie plate 44 which is electrically coupled to the cathode lead 54 or through separate leads from each of the cathode plates that are electrically coupled to the cathode lead 54.

With the cathode(s) in place (Step 144), the header 46 may be placed on the case 36 (Step 146) and the case may be filled with an inert gas such as argon or other inert gas (Step 148). A cold sink 132 may be applied around the perimeter of the case 36 below the welding point (Step 150) to help protect the anode 34 against heat damage. Additionally, a protector ring 126 may be included around the inside of the case 36 below the weld junction 128 to help protect the anode 34 from damage caused by the welding process. The header 46 may then be welded to the case 36 using conventional welding techniques. While this implementation shows the weld being accomplished from the top of the capacitor due to the design of the header 46 and case 36, alternative designs are also contemplated where the header overlaps the case so that welding would be applied from the side of the header to seal the junction rather than from the top. This aspect of the invention relating to shaping and anodizing an anode within a case and welding the header to the case does not require the particular configuration shown in this implementation and may be applied to many different capacitor designs and styles.

After the header is welded to the case (Step 152), the capacitor may be filled with electrolyte (Step 154), if a liquid electrolyte-type capacitor is being made, and the capacitor may be sealed (Step 156) using the same method described with reference to FIG. 9 or some other method known in the art. Although the anode and cathode leads 126 and 124 are shown extending from the header 110 in this particular implementation, this also is not required to practice the invention.

Similar laser welding may be used to attach the header 46 to the case 36 and create a hermetic seal. Also similar to the cylindrical-shaped capacitor 2 shown and described with reference to FIGS. 2 and 3, a seal 56 may be formed around a lead tube 58 and the top of the lead tube 58 may be sealed around the cathode lead 54 after the liquid electrolyte 38 is placed inside the case 36. An anode lead 60 may be welded to the case 36.

FIGS. 10A, 10B and 10C illustrate one example of how the cathode plates may be configured for use in the various implementations of the electrolytic capacitors disclosed herein. Although the cathode plates may be made separately or in pairs and then coupled together with additional cathode tie plates, the cathode tie plates may also be made integrally with one or more of the cathode plates. FIG. 10A illustrates a die cut or stamp cut plate 160, such as a foil plate described for use as cathode plates above, configured to make four cathode plates 162 and cathode tie plates 164 and 168 joining the four cathode plates 162. Once the plate 160 is cut (such as is shown in FIG. 10A), or after it is shaped as shown and described with reference to FIGS. 10B and 10C, it may be surrounded with a separator material as described previously herein if desired for a particular capacitor design implementation. The cathode plates 162 in this particular implementation are each folded perpendicularly to the cathode tie plate 164. A cathode lead may be welded to the cathode tie plate 168.

As can be seen in FIG. 10B, if only two cathode plates are needed, or if a designer desires to implement only pairs of cathode plates, this approach may be readily adapted to that end. Similarly, if additional pairs or even individual cathode plates are needed for a particular implementation, the plate 160 may be configured to add any number of additional plates using the same approach.

FIG. 10C illustrates the cathode tie plate 164 folded to place the cathode plates 162 in parallel for insertion into a plurality of wells within an anode. By configuring the plurality of cathode plates as a unitary piece from the same sheet of material, or at least in unitary pairs, rather than as individual plates that are later attached to each other, the interconnection time is reduced, production steps are eliminated, and the likelihood of failure of any particular step or component is reduced. To couple the cathode tie plate 168 to the cathode lead in particular implementations using a separator layer covering the cathode tie plate 168, the cathode tie plate 168 should be exposed through the separator layer covering at a convenient location 166 for the cathode lead to couple thereto while still maintaining separation of the exposed cathode plate and the anode or the cathode lead should be coupled prior to applying the separator layer.

Figure 13:
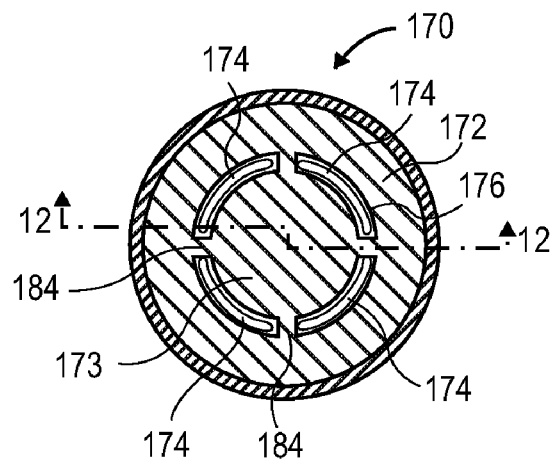
FIG. 13 is a second cross-sectional diagram of the fourth implementation of a capacitor taken along sectional line 13-13 of FIG. 12.
Figure 12:
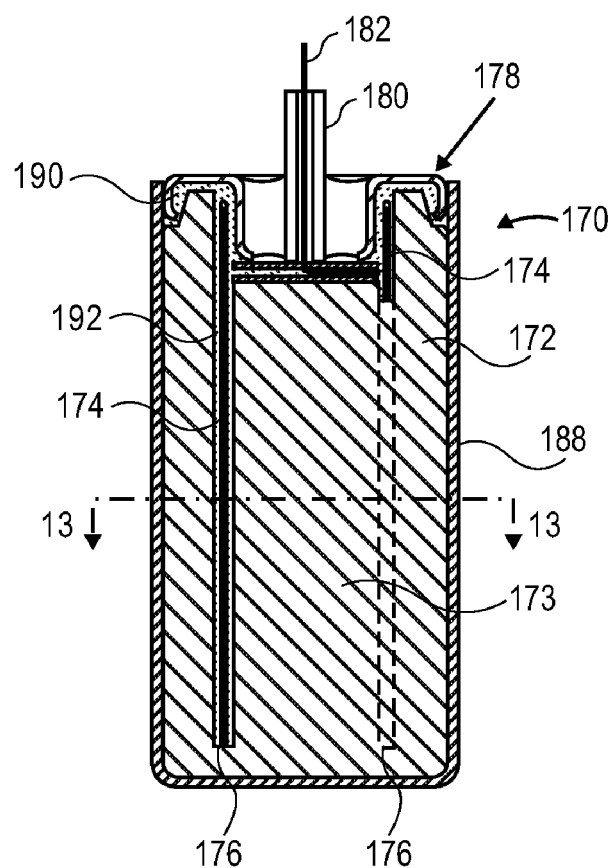
FIG. 12 is a cross-sectional diagram of a fourth implementation of a capacitor taken along sectional line 12-12 of FIG. 13.

The implementation shown in FIGS. 12 and 13 is made using similar methods and materials to those described with reference to the implementations shown and described with reference to the previous Figures. The capacitor 170 includes an anode having an outer ring of anode material 172 and an inner ring of anode material 173 with a single circular slot (or well) 176 defined on opposing sides by the anode material rings 172, 173. A cathode 174 and separator layer 192 are included within the well 176. The single well 176 may include multiple cavities or well extensions separated by vertical supports 184 made of anode material to define the circular slot 176 into individual slots as shown in FIGS. 12 and 13. Electrolyte 190 is included within the case 188, as discussed with reference to previous implementations disclosed herein.

It is anticipated that this anode structure will be formed as one integral, contiguous piece, but it may alternatively be formed as a separate outer and inner ring with vertical supports. The capacitor 170 includes a header 178 with a glass to metal seal around the lead tube 180. The cathode lead wire 182 extends through the lead tube 180 through the glass to metal seal to associate with the cathode 174. Note that the inner and outer anode materials 172, 173 and cathode 174 each extend up much higher in this implementation than in conventional cylindrical capacitor designs. This additional extension within the same case 188 dimension is advantageous to the capacitance. The header 178 may be attached to the case 188 as is known in the art to enclose the anode 172, 173 and cathode 174 within the case 188.

Like the implementations shown in FIGS. 2 and 5, though this is not a requirement of every contemplated implementation as described earlier, the at least one slot 176 in the anode 172, 173 of the implementation shown in FIG. 12 is contiguously surrounded on at least two opposing sides by the anode 172, 173. In these particular implementations, once the cathode 174 is placed within the slot 176, the anode 172,173 contiguously extends from a first side of the cathode 174, around three sides (edges) of the cathode 174, to a second, opposing side of the cathode 174. In other particular contemplated implementations, the anode may extend around only one or two sides (edges) of the slot to the opposing side of the slot.

Figure 14A:
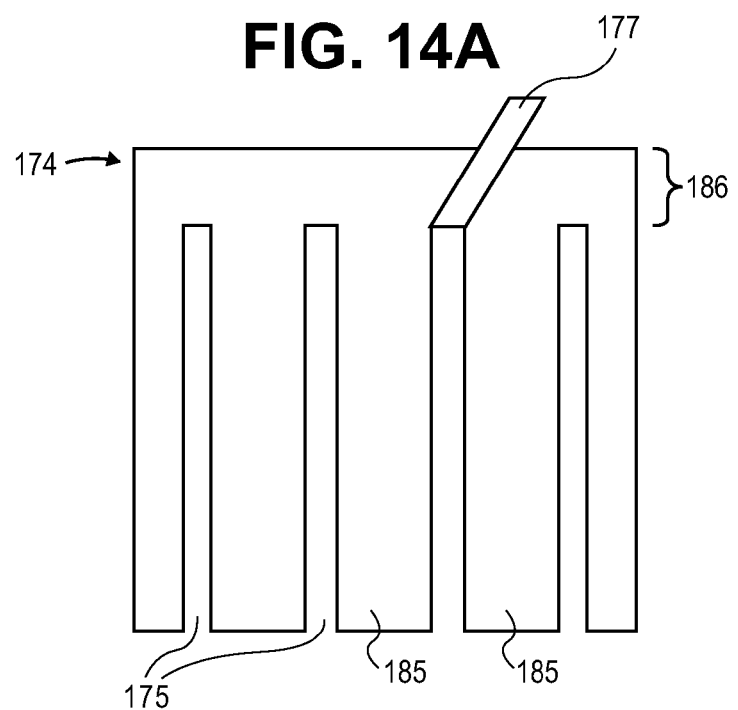
FIGS. 14A and 14B are views of bending stages for another particular implementation of a cathode plate.
Figure 14B:
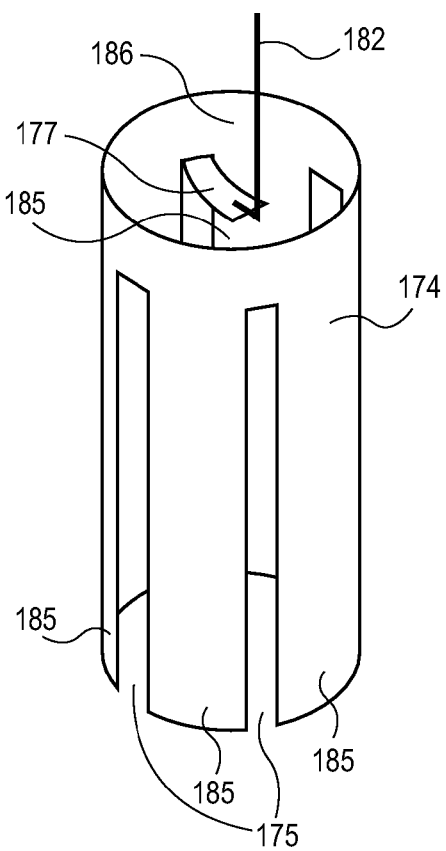

FIGS. 14A and 14B show two stages of bending a cathode 174 plate to fit within the slot of FIGS. 12 and 13. Cathode 174 includes notches 175 to accommodate the vertical supports 184. Material from one of the notches 175 is left attached to become a cathode lead connection tab 177 to which a cathode lead 182 is attached. As with previous implementations, separator material 192 may be cut to overlap cathode 174 in all directions and is then sealed around its perimeter except at connection tab 177, enveloping cathode 174. Cathode 174 and separator 192 are then bent into a cylindrical shape and connection tab 177 is folded inward prior to insertion into cathode slot 176 (FIGS. 12 and 13).

Figure 15:
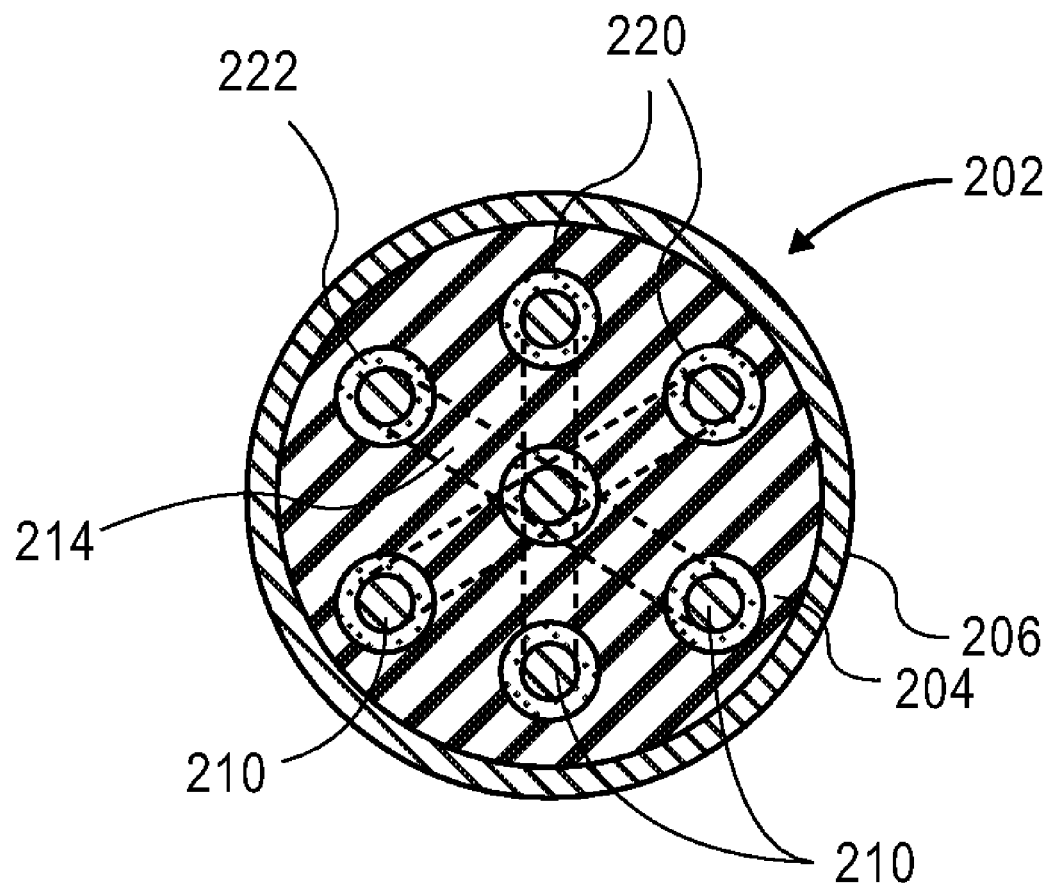
FIG. 15 is a cross-sectional diagram of a fifth implementation of a capacitor taken along a view similar to that shown in FIG. 3.

The implementation illustrated by the cross-sectional view of FIG. 15 shows a capacitor 202 comprising a plurality of cylindrical pellet cores 210 extending into a plurality of similarly shaped wells 220 in an anode 204. The manufacturing techniques, materials used to manufacture the capacitor 202, and the principles of the capacitor operation are like those of the first implementation shown and described with reference to FIGS. 2 and 3 with the exception that the cathodes and wells are cylindrical in shape and, therefore, involve slightly different structures, separator 222 material layers and isolators. Reference should be made to the descriptions of FIGS. 2 and 3 for an explanation of how the capacitor is made and those of ordinary skill in the art will readily understand and be able to apply those principles to the implementation and configuration of FIG. 15. In fact, other than the implementation of FIG. 15 having the possibility of multiple cathode tie plates 214, the cross-section of the implementation of FIG. 15 would look nearly identical to the cross-section shown in FIG. 2. The same header structure and case 206 structure may be used. This fifth implementation illustrated by FIG. 15 is included to further show that the cathodes are not limited to any particular shape or size and that cathode and well shapes beyond slots and plates are contemplated through this disclosure.

The cathode tie plate 214 of this particular implementation is shown as a star-shaped flat plate coupling the seven cathodes 210 to each other and to the cathode lead. The cathode tie plate(s) 214 are shown in dashed lines to reveal the underlying cathodes 210 and wells 220. A plurality of cathode tie plates 214 may alternatively be used. The particular size and shape of the tie plate 214 is not important to the invention and other cathode tie plates 214 or other electrically conductive structures of other sizes, shapes and dimensions may be substituted for the cathode tie plate 214 shown to serve the function of electrically coupling the cathodes 210 together (Step 96, FIG. 9).

Although the particular implementations shown in the drawings include one, two, three, four or more cathodes, there is no intended implication of a particular number of cathodes or wells for any implementation. A greater or fewer number of wells and/or cathodes for a particular implementation may be used.

It will be understood that implementations are not limited to the specific components disclosed herein, as virtually any components consistent with the intended operation of a method and/or system implementation for an electrolytic capacitor may be utilized. Accordingly, for example, although particular shapes and sizes of electrolytic capacitor components may be disclosed, such components may comprise any shape, size, style, type, model, version, class, grade, measurement, concentration, material, weight, quantity, and/or the like consistent with the intended operation of a method and/or system implementation for an electrolytic capacitor may be used. While the assembly of an electrolytic capacitor has been described in a particular sequence of steps with reference to the drawing figures, it will be understood that the assembly of an electrolytic capacitor is not limited to the specific order of steps as disclosed. Any steps or sequence of steps of the assembly indicated herein are given as examples of possible steps or sequence of steps and not as limitations, since various assembly processes and sequences of steps may be used to assemble electrolytic capacitors.

In places where the description above refers to particular implementations of electrolytic capacitors, it should be readily apparent that a number of modifications may be made without departing from the spirit thereof and that these implementations may be applied to other capacitor types. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrolytic capacitor comprising:
   an anode having a plurality of wells therein, wherein each of the plurality of wells is contiguously surrounded for a majority of its boundary by the anode;
   an electrically conductive case surrounding and electrically coupled to the anode;
   a plurality of cathodes each respectively extending into a well of the plurality of wells, wherein the cathodes are electrically coupled together and are electrically separated from the anode; and
   electrolyte within the plurality of wells and contacting both the anode and the plurality of cathodes.

2. The electrolytic capacitor of claim 1, wherein the anode and cathodes are contained within a case, the electrolyte is a liquid electrolyte, and the anode is electrically separated from the cathodes.

3. The electrolytic capacitor of claim 1, wherein each of the cathodes comprises a high surface area capacitive material layer over a majority of its surface.

4. The electrolytic capacitor of claim 1, wherein the anode is shaped from primarily tantalum powder.

5. The electrolytic capacitor of claim 1, wherein the anode is primarily titanium.

6. The electrolytic capacitor of claim 1, wherein the anode is primarily niobium.

7. The electrolytic capacitor of claim 1, wherein at least two of the plurality of cathodes have a cylindrical shape.

8. The electrolytic capacitor of claim 1, wherein at least two of the plurality of cathodes have a plate shape.

9. The electrolytic capacitor of claim 1, wherein at least two of the plurality of cathodes are a unitary piece.

10. The electrolytic capacitor of claim 1, wherein the plurality of cathodes comprises a plurality of cathode plates electrically coupled together and shaped to form a cylinder with slots extending between the cathode plates.

11. The electrolytic capacitor of claim 1, wherein the plurality of cathodes comprises a plurality of cathode plates shaped to form a cylindrical shape and the plurality of wells are arranged in a cylindrical shape such that the plurality of cathode plates fits into the plurality of wells.

12. The electrolytic capacitor of claim 1, further comprising at least one separator between the plurality of cathodes and the anode.

13. The electrolytic capacitor of claim 1, further comprising at least one isolator between the plurality of cathodes and the header.

14. The electrolytic capacitor of claim 1, further comprising at least one cathode tie plate electrically coupling each of the plurality of cathodes to each other.

15. The electrolytic capacitor of claim 14, further comprising at least a first isolator between the cathode tie plate and a header.

16. The electrolytic capacitor of claim 15, further comprising at least a second isolator between the anode and the at least one cathode tie plate.

17. The electrolytic capacitor of claim 1, wherein the electrolyte is a solid electrolyte.

18. The electrolytic capacitor of claim 1, wherein the electrolyte is a liquid electrolyte.

19. The electrolytic capacitor of claim 1, wherein the anode is a cylindrically shaped anode.

20. The electrolytic capacitor of claim 19, wherein the plurality of wells are each cylindrically shaped wells.

21. The electrolytic capacitor of claim 20, wherein the plurality of cathodes are each cylindrically shaped cathodes.

22. The electrolytic capacitor of claim 1, wherein the plurality of wells are each cylindrically shaped wells.

23. The electrolytic capacitor of claim 22, wherein the plurality of cathodes are each cylindrically shaped cathodes.

24. The electrolytic capacitor of claim 1, wherein the cathodes are electrically coupled together through a plurality of cathode tie plates.

25. The electrolytic capacitor of claim 1, wherein the cathodes are electrically coupled together through a cathode tie plate extending radially in a plurality of directions from a center cathode of the plurality of cathodes to the rest of the plurality of cathodes.

* * * * *